Patented Mar. 27, 1945

2,372,409

UNITED STATES PATENT OFFICE 2,372,409

PROCESS FOR PREPARING 2-OXAZOLINES

Philip F. Tryon, Terre Haute, Ind., assignor to Commercial Solvents Corporation, Terre Haute, Ind., a corporation of Maryland No Drawing. Application April 12, 1943, Serial No. 482,758

5 Claims. (Cl. 260—307)

My invention relates to new and useful 2-oxazolines and to a process for the production thereof. More particularly it relates to 2-oxazolines that may be synthesized from nitro esters.

The 2-oxazolines of my invention are represented by the following structural formula:

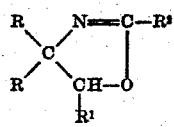

in which R represents hydrogen, alkyl, aryl, or alpha-acyloxyalkyl; $R^1$ represents hydrogen, aryl, or alkyl; and $R^2$ may be either hydrogen, alkyl, aryl or alpha-hydroxyalkyl.

Examples of 2-oxazolines included by the above formula are 2,4,4-trimethyl-2-oxazoline, 2-(1-hydroxyethyl)-4,4-dimethyl-2-oxazoline, 2-phenyl-4,4-dimethyl-2-oxazoline, 2-heptadecyl-4,4-dimethyl-2-oxazoline, 2,4,5-trimethyl-2-oxazoline, 2-methyl-4-ethyl-2-oxazoline, 2-pentyl-4,5-dimethyl-4-hexanooxyethyl-2-oxazoline, 2-pentyl-4,4-bis(hexanooxymethyl)-2-oxazoline, 2-methyl-4,4-bis(acetoxymethyl)-2-oxazoline, 2-undecyl-4-methyl-4-lauroxymethyl-2-oxazoline, 2-heptadecyl-4-methyl-5-phenyl-2-oxazoline, 2-methyl-5-phenyl-2-oxazoline, 2-undecyl-4,4-dimethyl-5-phenyl-2-oxazoline, 2-methyl-4-phenyl-2-oxazoline, and the like.

In my copending application, U. S. Serial No. 482,760, filed April 12, 1943, I have described a method for preparing 2-oxazolines from O-acylated amides. I have now found that 2-oxazolines can be prepared directly from beta nitro carboxylic esters in one operation. The steps of reduction, rearrangement, and condensation are caused to progress as desired by careful control of the reaction conditions, particularly that of temperature, especially subsequent to the completion of the reduction step.

The reaction of my invention proceeds somewhat as follows:

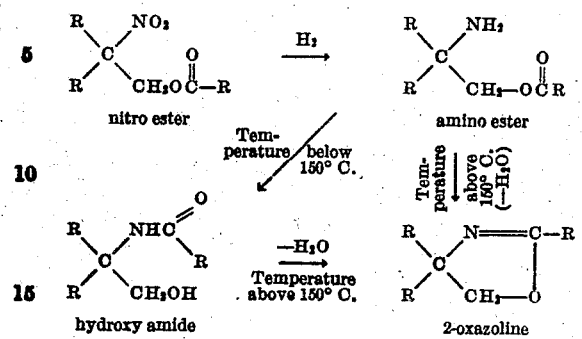

In carrying out my invention, the beta nitro carboxylic ester is preferably dissolved in a solvent such as a lower aliphatic alcohol, for example, methanol or ethanol, after which the resulting solution is placed in a suitable hydrogenation apparatus and subjected to the action of molecular hydrogen in the presence of a catalyst, preferably one that is active at relatively low temperatures, such as for example, Raney nickel. Reduction of the beta nitro ester by the aforesaid means is suitably effected at temperatures between about 30 and 50° C. and pressures of from about 500 to approximately 2000 lbs. per square inch. After hydrogenation is complete, the catalyst is separated from the mixture by filtration and the solvent removed by distillation.

In order to obtain the 2-oxazoline compound from this residue, which contains chiefly the corresponding beta amino ester, the latter is heated to a temperature in excess of about 150° C. During this step, water is produced and in certain instances, depending upon the boiling point of the 2-oxazoline produced, it may be desirable to remove the water as a constant boiling mixture by adding thereto a water immiscible liquid such as benzene. When all of the water has been removed, the final residue consists principally of the crude 2-oxazoline which may be further purified by fractional distillation, under reduced pressure if desired.

At the distillation stage, control of temperature is an important factor in determining the course of the reaction. In order to provide conditions most favorable to the production of the 2-oxazoline it will be found desirable to use atmospheric pressure and to maintain the temperature of the liquid between about 150° C. and 220° C. and preferably at a temperature of approximately 200° C. or higher depending upon the particular beta nitro ester utilized. The formation of limited amounts of oxazoline has been observed at temperatures between 100-150° C., but as indicated by the above equations, a hydroxy amide is the chief product when the process is effected under the aforesaid temperature conditions. There are, however, small amounts of the oxazoline produced within this temperature range but the latter is not readily separated from such mixtures.

Beta nitro esters which may be used for the preparation of the 2-oxazolines of my invention are represented by the following generic formula:

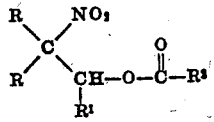

in which R may be either hydrogen, alkyl, aryl, or alphaacyloxyalkyl; R¹ represents hydrogen, aryl, or alkyl; and R² may be either hydrogen, alkyl, aryl or alphahydroxyalkyl. Compounds included by the above formula are 2-nitroisobutyl acetate, 2-nitroisobutyl lactate, 3-nitro-2-butyl acetate, 2-nitroisobutyl stearate, 2-nitrobutyl acetate, 2-nitro-2-methyl-1,3-propanediol diacetate, 2-nitroisobutyl benzoate, 2-nitro-2-methyl-1,3-propanediol dilaurate, tris-(acetoxy) methylnitromethane, 2-nitro-2-ethyl-1,3-propanediol dibutyrate, 2-nitro-2-phenyl-1-propyl stearate, 2-nitro-2-phenylethyl acetate, and the like.

Illustrative of my invention are the examples given below:

Example I

One hundred sixty-one parts of 2-nitro-2-methyl-1-propyl acetate was introduced into a reaction vessel together with 650 parts of methanol and 15 parts of Raney nickel catalyst, and thereafter subjected to hydrogenation at 35° C., and 1000 lbs. pressure for 6 hours. The catalyst was then removed from the mixture by filtration and the methanol by distillation through a packed column. A small amount of benzene was added to the distillation system and water was taken off continuously through a decanter, up to a final liquid temperature of 200° C. After this distillation and complete removal of water by separation with benzene, the fractionation was continued and 2, 4, 4-trimethyl-2-oxazoline was obtained in the form of a water white liquid.

Example II 2-undecyl-4,4-dimethyl-2-oxazoline was prepared by dissolving 300 parts of 2-nitro-2-methyl-1-propyl laurate in 625 parts of methanol and contacting the resulting solution with molecular hydrogen at a temperature of 40° C. and a pressure of 600 lbs. in the presence of 20 parts of a Raney nickel catalyst. After hydrogen absorption was complete, the catalyst was removed from the hydrogenation mixture and the resulting filtrate processed in the manner described in Example I. The 2-undecyl-4,4-dimethyl-2-oxazoline thus obtained was a brown viscous liquid slightly soluble in water and quite soluble in the common organic solvents such as alcohol, benzene and acetone.

Example III

A mixture consisting of 154 parts of methyl bis(acetoxymethyl)nitromethane, 650 parts of ethanol, and 15 parts of Raney nickel catalyst was subjected to hydrogenation at 33° C. and 1400 lbs. pressure for a period of 5 hours. After the absorption of hydrogen ceased, the catalyst was separated from the mixture by filtration and the filtrate processed as in Example I. The 2,4-dimethyl-4-acetoxymethyl-2-oxazoline thus produced was a water-white liquid.

Example IV

One hundred fifty parts of 2-nitroisobutyl benzoate was introduced into a suitable hydrogenation chamber together with 600 parts of ethyl alcohol and 20 parts of Raney nickel. This mixture was then subjected to reduction with molecular hydrogen at a temperature of 35° C. and a pressure of 1200 lbs. After the hydrogenation appeared to be complete, the catalyst was removed from the crude hydrogenated material and the latter converted to the corresponding 2-phenyl-4,4-dimethyl-2-oxazoline in the usual manner.

Example V

One hundred thirty-nine parts of tris(acetoxymethyl)nitromethane, 1100 parts of methanol and 15 parts of Raney nickel catalyst were placed in a suitable hydrogenation apparatus and sealed. This mixture was then subjected to hydrogenation at a pressure of 1400 lbs. per square inch at 30° C. for a period of approximately 5 hours. After the absorption of hydrogen had ceased, the reaction mixture was withdrawn from the hydrogenation apparatus, the catalyst removed from the solution by filtration and the methanol separated from the reaction mixture by distillation. The residue thus obtained was then fractionally distilled in accordance with the method employed in the foregoing examples, and the 2-methyl-4,4-bis(acetoxymethyl)-2-oxazoline collected at 125°-127° C. (3 mm.).

The 2-oxazolines of the type prepared as described above are generally liquids soluble in water, alcohol, and benzene. These new compounds have been found to be useful in the preparation of compositions possessing surface active properties. Other uses of these materials will be apparent to those skilled in the art.

While the above description sets forth the preferred embodiments of my invention, it is to be understood that it is in no way limitative. For example, instead of employing molecular hydrogen and a catalyst to reduce the nitro esters in carrying out the present invention, chemical methods of reduction may be utilized.

Having described my invention, what I claim is:

1. A process for the production of 2-oxazolines which comprises subjecting a beta nitro alkyl carboxylic ester to hydrogenation to produce the corresponding amino ester, thereafter subjecting the amino ester to distillation at a liquid temperature in excess of about 150° C. to effect a concomitant rearrangement of the amino ester to an amide and condensation thereof to the corresponding 2-oxazoline.

2. In a process for the production of 2-oxazolines by the reduction of beta nitro alkyl carboxylic esters and their subsequent rearrangement and condensation, the steps which comprise subjecting the said nitro ester to hydrogenation in the presence of a nickel hydrogenation catalyst at elevated pressures, removing the catalyst and water of reduction, and subjecting the resulting amino ester to distillation at a liquid temperature above 150° C.

3. A process for the production of 2,4,4-trimethyl-2-oxazoline from 2-nitro-2-methyl-1-propyl acetate, which comprises subjecting the said nitro compound to hydrogenation to produce the corresponding amino ester, and subjecting said amino ester to distillation at a temperature in excess of 150° C. to produce the 2,4,4-trimethyl-2-oxazoline.

4. In a process for the production of 2-methyl-4,4-bis(acetoxymethyl)-2-oxazoline from tris-(acetoxymethyl)nitromethane, the steps which comprise subjecting the latter to hydrogenation to produce the corresponding amino ester, and thereafter subjecting said amino ester to distillation at a temperature in excess of 150° C. to produce the 2-methyl-4,4-bis(acetoxymethyl)-2-oxazoline.

5. A process for the production of 2,4-dimethyl-4-acetoxymethyl-2-oxazoline from methyl-bis(acetoxymethyl)nitromethane, which comprises subjecting the latter to hydrogenation to produce the corresponding amino ester, and thereafter subjecting said amino ester to distillation at a temperature in excess of 150° C. to produce the 2,4-dimethyl-4-acetoxymethyl-2-oxazoline.

PHILIP F. TRYON.